United States Patent
Kleyer et al.

(10) Patent No.: US 11,098,165 B2
(45) Date of Patent: *Aug. 24, 2021

(54) METAL APROTIC ORGANOSILANOXIDE COMPOUND

(71) Applicant: Dow Silicones Corporation, Midland, MI (US)

(72) Inventors: Don Lee Kleyer, Hemlock, MI (US); Nanguo Liu, Midland, MI (US); Nick Evan Shephard, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 361 days.

This patent is subject to a terminal disclaimer.

(21) Appl. No.: 16/316,088

(22) PCT Filed: Jun. 7, 2017

(86) PCT No.: PCT/US2017/036267
§ 371 (c)(1),
(2) Date: Jan. 8, 2019

(87) PCT Pub. No.: WO2018/013261
PCT Pub. Date: Jan. 18, 2018

(65) Prior Publication Data
US 2020/0317869 A1    Oct. 8, 2020

Related U.S. Application Data

(60) Provisional application No. 62/361,773, filed on Jul. 13, 2016.

(51) Int. Cl.
| | | |
|---|---|---|
| *C08G 77/58* | (2006.01) | |
| *C07F 5/06* | (2006.01) | |
| *C07F 7/08* | (2006.01) | |
| *C07F 9/00* | (2006.01) | |
| *C07F 15/02* | (2006.01) | |
| *C08K 5/5419* | (2006.01) | |
| *C08K 5/56* | (2006.01) | |

(52) U.S. Cl.
CPC .............. *C08G 77/58* (2013.01); *C07F 5/069* (2013.01); *C07F 7/0838* (2013.01); *C07F 9/005* (2013.01); *C07F 15/025* (2013.01); *C08K 5/5419* (2013.01); *C08K 5/56* (2013.01)

(58) Field of Classification Search
CPC ....... C08G 77/58; C08G 77/16; C07F 15/025; C07F 5/069
See application file for complete search history.

(56) References Cited

U.S. PATENT DOCUMENTS

| | | |
|---|---|---|
| 3,413,242 A | 11/1968 | Roberts et al. |
| 5,075,154 A | 12/1991 | Eckberg |
| 5,614,564 A | 3/1997 | Miyake et al. |
| 6,495,708 B1 | 12/2002 | Yang et al. |
| 6,512,037 B1 | 1/2003 | Ahn et al. |
| 7,777,356 B2 | 8/2010 | Katayama et al. |
| 7,825,117 B2 | 11/2010 | Hara |
| 8,372,927 B2 | 2/2013 | Figueroa et al. |
| 9,382,450 B2 | 7/2016 | Belmont |
| 9,556,327 B2 | 1/2017 | Kleyer et al. |
| 9,598,576 B2 | 3/2017 | Okawa et al. |
| 9,951,186 B2 | 4/2018 | Enami |
| 10,047,198 B2 | 8/2018 | Surgenor et al. |
| 10,723,914 B2 * | 7/2020 | Liu ..................... C07F 15/025 |
| 2011/0282086 A1 | 11/2011 | Murakami et al. |
| 2013/0284978 A1 | 10/2013 | Deshazer et al. |
| 2014/0371056 A1 | 12/2014 | Brandstadt et al. |
| 2015/0376344 A1 | 12/2015 | Dent et al. |
| 2016/0194496 A1 * | 7/2016 | Okawa ................. C07F 7/0872 257/100 |
| 2016/0208138 A1 | 7/2016 | Nishijima et al. |
| 2020/0140687 A1 | 5/2020 | Liu et al. |

FOREIGN PATENT DOCUMENTS

| | | |
|---|---|---|
| WO | 2014160112 | 10/2014 |
| WO | 2015033979 | * 3/2015 |

OTHER PUBLICATIONS

Search report from corresponding Japan 2018-567263 application, dated Jul. 6, 2020.
McNaught. "Compendium of Chemical Terminology, 2nd ed. (the "Gold Book")". Blackwell Scientific Publications, Oxford (2014).
Shaow B. Lin: "High-Temperature Stability of Silicone Polymers and Related Pressure-Sensitive Adhesives" in: "High-Temperature Properties and Applications of Polymeric Materials", Oct. 13, 1995, American Chemical Society, Washington, DC, vol. 603, pp. 37-51.
Search report from corresponding China 201780039770.9 application.

* cited by examiner

Primary Examiner — Kuo Liang Peng

(57) ABSTRACT

A metal aprotic organosilanoxide compound of formula (I): $\{R^1—Si(R^2)(R^3)—[O—Si(R^4)(R^5)]_m—O\}_n-M^1(\leftarrow L)_o(X^1)p$ (I), wherein $M^1$ is a metal atom Al, Ce, Fe, or V, a composition or formulation containing or prepared from it, and methods of making and using them. Each molecule of the metal aprotic organosilanoxide compound is composed of at least one metal atom and at least one aprotic organosilanoxide ligand. The metal aprotic organosilanoxide compound may be used as such or as a constituent in a variety of silicone formulations for adhesives, coatings, elastomers, encapsulants, pottants, and sealants.

11 Claims, No Drawings

METAL APROTIC ORGANOSILANOXIDE COMPOUND

This application is a U.S. national stage filing under 35 U.S.C. § 371 of PCT Application No. PCT/US17/036267 filed on 7 Jun. 2017, currently pending, which claims the benefit of U.S. Provisional Patent Application No. 62/361773 filed 13 Jul. 2016 under 35 U.S.C. § 119 (e). PCT Application No. PCT/US17/036267 and U.S. Provisional Patent Application No. 62/361773 are hereby incorporated by reference.

TECHNICAL FIELD

This invention generally relates to a metal aprotic organosilanoxide compound, compositions containing or prepared from it, and methods of making and using it.

BACKGROUND OF THE RELATED ART

Incumbent adhesives may undesirably adhere weakly to certain substrate materials, degrade or decompose (e.g., embrittle or discolor), or delaminate from their substrates under harsh environmental conditions such as air, heat, humidity, and/or sunlight. To decrease the frequency or severity of delamination (e.g., bubbling or peeling), some substrates may be pre-processed (e.g., primed or pre-dried) before being adhered. Or an adhesion promoter may be used as a primer on the substrate or as an additive in the adhesive. Even so, the adhesive may exhibit weak adhesion or aging instability when used in demanding applications.

BRIEF SUMMARY OF THE INVENTION

This invention generally relates to a metal aprotic organosilanoxide compound, a composition or formulation containing or prepared from it, and methods of making and using them. Each molecule of the metal aprotic organosilanoxide compound is composed of at least one metal atom and at least one aprotic organosilanoxide ligand. The metal aprotic organosilanoxide compound may be used as such or as a constituent in a variety of silicone formulations for adhesives, coatings, elastomers, encapsulants, pottants, and sealants.

DETAILED DESCRIPTION OF THE INVENTION

The Brief Summary and Abstract are incorporated here by reference. The metal atom may be aluminum, cerium, iron, vanadium, or a combination of any two or more thereof. The aprotic organosilanoxide ligand may be an anion that is a conjugate base form of an organosilanol and contains on average, per aprotic organosilanoxide ligand, at least one anionic functional group, Si—O$^-$. The aprotic organosilanoxide ligand is free of —OH, —NH, —SH, —PH, and, optionally, SiH groups. The metal aprotic organosilanoxide compound, composition and formulation may be used in diverse applications in industries such as building, construction, consumer products, electronics, energy, infrastructure, packaging, telecommunications, and transportation. This invention is described herein in an illustrative manner by disclosing a plurality of representative, non-limiting embodiments and examples. In some embodiments the invention is any one of the following numbered aspects.

Aspect 1. A metal aprotic organosilanoxide compound of formula (I): $\{R^1—Si(R^2)(R^3)—[O—Si(R^4)(R^5)]_m—O\}_n$-$M^1(\leftarrow L)_o(X^1)_p$ (I), wherein $M^1$ is a metal atom Al, Ce, Fe, or V having a formal positive oxidation state, $\delta^+$, of +1 to +3 for Al, +2 to +4 for Ce, +1 to +6 for Fe, or +1 to +5 for V; subscript n is an integer from 1 to $\delta^+$; subscript o is an integer of 0, 1 or 2; each L independently is an aprotic Lewis base; subscript p=($\delta^+$-n); each $X^1$ independently is a halide or an aprotic organoheteryl anion; subscript m is an integer from 3 to 100; each of $R^1$ to $R^5$ is independently is an aprotic ($C_1$-$C_{20}$)hydrocarbyl group or aprotic ($C_2$-$C_{20}$)heterohydrocarbyl group, wherein at least one of $R^1$ to $R^5$ independently is an aprotic ($C_2$-$C_{20}$)alkenyl group or aprotic ($C_2$-$C_{20}$) alkynyl group. The ($C_2$-$C_{20}$)heterohydrocarbyl group contains 2 to 20 carbon atoms and at least one heteroatom selected from N, O, S, and P; alternatively N, O, and S; alternatively N and O; alternatively N; alternatively O; alternatively S; alternatively P.

The metal aprotic organosilanoxide compound of formula (I) may be a molecule, or a collection of molecules. Each metal atom of the metal aprotic organosilanoxide compound of formula (I) independently has a formal positive oxidation state, $\delta^+$, which is reflective of the metal atom's known positive oxidation states described above. Each anionic functional group, Si—O$^-$, of the aprotic organosilanoxide ligand has a formal negative oxidation state, $\delta^-$, equal to -1, and the aprotic organosilanoxide ligand has a total formal negative oxidation state, $\delta^-$, equal to -y, wherein y is an integer equal to the total number of anionic functional groups, Si—O$^-$, per aprotic organosilanoxide ligand. In some aspects there is one anionic functional group, Si—O$^-$, per aprotic organosilanoxide ligand, i.e., per molecular anion, and $\delta^-$=-y=-1. In some embodiments, (-y*-1)=$\delta^+$ of the metal atom, wherein * is a multiplication symbol, and the metal aprotic organosilanoxide compound of formula (I) is free of other anionic ligands. In other embodiments, (-y*-1)<$\delta^+$ of the metal atom, and the metal aprotic organosilanoxide compound of formula (I) further contains p additional anionic ligands independently selected from halide and an aprotic organoheteryl anion, wherein p+(-y*-1)=$\delta^+$.

In some aspects at least one, alternatively each, $M^1$ is a metal atom Al, Ce, or Fe; alternatively Al, Ce, or V; alternatively Al, Fe, or V; alternatively Ce, Fe, or V.

Aspect 2. The metal aprotic organosilanoxide compound of aspect 1 wherein $M^1$ is Al and $\delta^+$ is +1 or +2, alternatively +1 or +3, alternatively +2 or +3, alternatively +1, alternatively +2, alternatively +3. This compound may be called an aluminum aprotic organosilanoxide.

Aspect 3. The metal aprotic organosilanoxide compound of aspect 1 wherein $M^1$ is Ce and $\delta^+$ is +2 or +3, alternatively +2 or +4, alternatively +3 or +4, alternatively +2, alternatively +3, alternatively +4. This compound may be called a cerium aprotic organosilanoxide.

Aspect 4. The metal aprotic organosilanoxide compound of aspect 1 wherein $M^1$ is Fe and $\delta^+$ is +2 to +6, alternatively +1 to +5, alternatively +2 to +5, alternatively +2 to +4, alternatively +1 or +2, alternatively +2 or +3, alternatively +2 or +4, alternatively +3 or +4, alternatively +1, alternatively +2, alternatively +3, alternatively +4, alternatively +5, alternatively +6. This compound may be called an iron aprotic organosilanoxide.

Aspect 5. The metal aprotic organosilanoxide compound of aspect 1 wherein $M^1$ is V and $\delta^+$ is +2 to +5, alternatively +1 to +4, alternatively +2 to +5, alternatively +1 or +2, alternatively +2 or +3, alternatively +3 or +4, alternatively +4 or +5, alternatively +1, alternatively +2, alternatively +3, alternatively +4, alternatively +5. This compound may be called a vanadium aprotic organosilanoxide.

Aspect 6. The metal aprotic organosilanoxide compound of any one of aspects 1 to 5 wherein $M^1$ is Al and $\delta^+$ is +3; $M^1$ is Ce and $\delta^+$ is +3 or +4; $M^1$ is Fe and $\delta^+$ is +2 or +3; or $M^1$ is V and $\delta^+$ is +5.

Aspect 7. The metal aprotic organosilanoxide compound of any one of aspects 1-5 wherein subscript n is an integer from 2 to $\delta^+$, alternatively $\delta^+$.

Aspect 8. The metal aprotic organosilanoxide compound of any one of aspects 1-7 wherein subscript o is an integer of 0, alternatively 1 or 2, alternatively 1, alternatively 2. When o is 0, L is absent. When o is 1, one L is present and forms a co-ordinate bond, also called a dative bond, to $M^1$. When o is 2, two independently selected L are present, or one bidentate L is present, and form(s) a total of two co-ordinate bonds to $M^1$. The aprotic Lewis base for L is a neutral, electron pair-donor compound having a molecular weight of from 50 to 500 grams per mole (g/mol) and independently may be selected from an alkene, an alkyne, a tertiary amine of formula $R_3N$, a carboxylic ester of formula $RCO_2R$, an ether of formula ROR, a ketone of formula RC(=O)R, a thioether of formula RSR, a trihydrocarbylphosphine of formula $(R)_3P$, or corresponding difunctional analogs thereof such as diamines, dicarboxylic esters, diethers, diketones, dithioethers, or diphosphines.

Aspect 9. The metal aprotic organosilanoxide compound of any one of aspects 1-8 wherein subscript $p=(\delta^+\text{-}n)$, wherein subscript n is an integer from 2 to $\delta^+$, alternatively $\delta^+$.

Aspect 10. The metal aprotic organosilanoxide compound of any one of aspects 1-9 wherein subscript m is an integer from 3 to 50, alternatively 70 to 100, alternatively 40 to 69, alternatively 3 to 39, alternatively 3 to 30, alternatively 3 to 20, alternatively 3 to 10, alternatively 11 to 100, alternatively 15 to 100, alternatively 20 to 100, alternatively 3, alternatively 4, alternatively 5, alternatively 6, alternatively 7, alternatively 8, alternatively 9, alternatively 10, alternatively m is an integer selected from all but one of 3 to 100. When m is an integer of 3 or 4, the metal aprotic organosilanoxide compound of formula (I) may be referred to as a metal aprotic oligoorganosilanoxide compound. When m is an integer from 5 to 100, the metal aprotic organosilanoxide compound of formula (I) may be referred to as a metal aprotic polyorganosilanoxide compound. If m would be 1 or 2 or >100, the metal aprotic organosilanoxide compound of formula (I) may exhibit weak adhesion promoting or adhesion co-promoting effects; impart undesirable physical properties to a formulation (e.g., decrease dynamic viscosity too much or be too volatile if m is 1 or 2 or increase dynamic viscosity too much or bury the favorable effect of $M^1$ if m is >100).

Aspect 11. The metal aprotic organosilanoxide compound of any one of aspects 1-10 wherein each $X^1$ independently is a halide, alternatively an aprotic organoheteryl anion. The halide may be fluoride, chloride, bromide, or iodide; alternatively fluoride, chloride, or bromide; alternatively fluoride or chloride; alternatively fluoride; alternatively chloride. The aprotic organoheteryl anion may be selected from an alkoxide (i.e., $RXO^-$), a carboxylate (i.e., $RXC(=O)O^-$), an oximate (i.e., $RX_2C=NO^-$), a secondary amino ($RX_2N—$), or a trihydrocarbylsilanoxide (i.e., $RX_3SiO^-$). Each RX independently is an aprotic ($C_1$-$C_{20}$)hydrocarbyl selected from a ($C_1$-$C_{20}$)alkyl, ($C_2$-$C_{20}$)alkenyl, or ($C_6$-$C_{20}$)aryl; alternatively a ($C_1$-$C_6$)alkyl or ($C_2$-$C_6$)alkenyl; alternatively ($C_1$-$C_6$)alkyl; alternatively methyl, ethyl, or phenyl.

Aspect 12. The metal aprotic organosilanoxide compound of any one of aspects 1-11 wherein each of $R^1$ to $R^5$ is independently as defined in any one of limitations (i) to (x):

(i) each of $R^1$ to $R^5$ is independently an aprotic ($C_1$-$C_{20}$)hydrocarbyl group or aprotic ($C_2$-$C_{20}$)heterohydrocarbyl group, wherein at least one of $R^1$ to $R^5$ independently is an aprotic ($C_2$-$C_{20}$)alkenyl group; (ii) each of $R^1$ to $R^5$ is independently an aprotic ($C_1$-$C_{20}$)hydrocarbyl group, wherein at least one of $R^1$ to $R^5$ independently is an aprotic ($C_2$-$C_{20}$)alkenyl group or aprotic ($C_2$-$C_{20}$)alkynyl group; (iii) each of $R^1$ to $R^5$ is independently an aprotic ($C_1$-$C_{20}$)hydrocarbyl group, wherein at least one of $R^1$ to $R^5$ independently is an aprotic ($C_2$-$C_{20}$)alkenyl group; (iv) each of $R^1$ to $R^5$ is independently an aprotic ($C_1$-$C_{20}$)hydrocarbyl group, wherein at least one of $R^1$ to $R^5$ independently is an aprotic ($C_2$-$C_{20}$)alkynyl group; (v) at least one of $R^1$ to $R^5$ independently is an aprotic ($C_2$-$C_{20}$)alkenyl group or aprotic ($C_2$-$C_{20}$)alkynyl group, at least one of $R^1$ to $R^5$ independently is an aprotic ($C_2$-$C_{20}$)heterohydrocarbyl group, and any remaining $R^1$ to $R^5$ independently is an aprotic ($C_1$-$C_{20}$)hydrocarbyl group; (vi) at least one of $R^1$ to $R^5$ independently is an aprotic ($C_2$-$C_{20}$)alkenyl group, at least one of $R^1$ to $R^5$ independently is an aprotic ($C_2$-$C_{20}$)heterohydrocarbyl group, and any remaining $R^1$ to $R^5$ independently is an aprotic ($C_1$-$C_{20}$)hydrocarbyl group; (vii) limitation (v) or (vi) wherein at least two of $R^1$ to $R^5$ independently are aprotic ($C_2$-$C_{20}$)heterohydrocarbyl groups; (viii) any one of limitations (i) to (vii) wherein at least two of $R^1$ to $R^5$ independently are aprotic ($C_2$-$C_{20}$)alkenyl and/or aprotic ($C_2$-$C_{20}$)alkynyl groups; (ix) any one of limitations (i) to (viii) wherein at least two of $R^1$ to $R^5$ independently are aprotic ($C_2$-$C_{20}$)alkenyl groups; and (x) any one of limitations (i) to (ix) wherein each aprotic ($C_1$-$C_{20}$)hydrocarbyl group is independently selected from an aprotic ($C_1$-$C_{20}$)alkyl, aprotic ($C_3$-$C_{20}$)cycloalkyl, and aprotic ($C_6$-$C_{20}$)aryl group.

Examples of suitable aprotic ($C_2$-$C_{20}$)alkenyl groups are aprotic ($C_2$-$C_{10}$)alkenyl, aprotic ($C_2$-$C_6$)alkenyl, unsubstituted ($C_2$-$C_6$)alkenyl, vinyl, allyl, 1-buten-1-yl, 1-buten-4-yl, and 1-hexen-6-yl.

Examples of suitable aprotic ($C_2$-$C_{20}$)alkynyl groups are aprotic ($C_2$-$C_{10}$)alkynyl, aprotic ($C_2$-$C_6$)alkynyl, unsubstituted ($C_2$-$C_6$)alkynyl, acetylenyl, propargyl, 1-butyn-1-yl, 1-butyn-4-yl, and 1-hexyn-6-yl.

Examples of suitable aprotic ($C_1$-$C_{20}$)hydrocarbyl groups are aprotic ($C_2$-$C_{20}$)alkenyl; aprotic ($C_2$-$C_{20}$)alkynyl; aprotic ($C_1$-$C_{10}$)hydrocarbyl; aprotic ($C_1$-$C_{10}$)alkyl; aprotic ($C_3$-$C_{10}$)cycloalkyl; aprotic ($C_6$-$C_{10}$)aryl; unsubstituted ($C_1$-$C_{10}$)alkyl; unsubstituted ($C_3$-$C_{10}$)cycloalkyl; unsubstituted ($C_6$-$C_{10}$)aryl; methyl; ethyl; propyl; 1-methylethyl; butyl; 1-methylpropyl; 2-methylpropyl; 1,1-dimethylethyl; and phenyl.

Examples of suitable aprotic ($C_2$-$C_{20}$)heterohydrocarbyl groups are aprotic ($C_2$-$C_{10}$)heterohydrocarbyl; aprotic ($C_2$-$C_6$)heterohydrocarbyl; aprotic ($C_2$-$C_6$)heteroalkyl; aprotic ($C_2$-$C_6$)heterocycloalkyl; aprotic ($C_2$-$C_6$)heteroaryl; unsubstituted ($C_2$-$C_6$)heteroalkyl; unsubstituted ($C_2$-$C_6$)heterocycloalkyl; unsubstituted ($C_2$-$C_6$)heteroaryl; 1-methoxyethyl; oxiranyl; piperidin-1-yl; thiazolyl; and pyridinyl.

Any of the foregoing $R^1$ to $R^5$ and RX groups (collectively, "R") may be unsubstituted or substituted with one or more aprotic substituents independently selected from: halo, unsubstituted or fluoro-substituted ($C_1$-$C_6$)alkyl, unsubstituted or fluoro-substituted ($C_1$-$C_6$)alkoxy, unsubstituted or fluoro-substituted ($C_1$-$C_6$)mercapto, oxo (=O; on alkyl groups), unsubstituted or fluoro-substituted phenyl, unsubstituted or fluoro-substituted ($C_1$-$C_6$)acyl, unsubstituted or fluoro-substituted ($C_1$-$C_6$)carboxy, unsubstituted or fluoro-substituted ($C_1$-$C_6$)alkylOC(=O)—, unsubstituted or fluoro-substituted ($C_2$-$C_6$)epoxy, unsubstituted di(($C_1$-$C_6$)

alkyl)amino, and nitrile (—CN). Halo is F, Cl, Br, or I; alternatively F, Cl, or Br; alternatively F or Cl; alternatively F; alternatively Cl. When there are two or more substituents in a particular "R" group, the number of substituents is from 2 to per substitution. Typically, per substitution is limited to 5 halo substituents, e.g., trifluoromethyl, trifluoromethoxy, or pentachloroethyl. Typically, the maximum number of non-halo substituents in a particular "R" group is equal to the number of carbon atoms of the corresponding unsubstituted version of that "R" group. For example, a substituted ($C_6$)hydrocarbyl group may contain at most six substituents, each independently selected as described above.

Fluoro-substituents in any one or more of the $R^1$ to $R^5$ and RX groups may enhance the shelf-life stability at 25° C. of the metal aprotic organosilanoxide compound of formula (I). Alternatively, unsubstituted di(($C_1$-$C_6$)alkyl)amino substituents in any one or more of the $R^1$ to $R^5$ and RX groups may decrease the shelf-life stability at 25° C. of the metal aprotic organosilanoxide compound of formula (I). In some embodiments the unsubstituted di(($C_1$-$C_6$)alkyl)amino substituents may enable gelation of the collection of molecules of the substituted metal aprotic organosilanoxide compound of formula (I) containing same. Gelation may be desirable in applications in which gels may be employed such as in priming a surface of a substrate or in forming a thermal gel for use as a thermal interface material. In applications where gelation is undesirable, or for enabling extended storage times, the metal aprotic organosilanoxide compound of formula (I) containing the unsubstituted di(($C_1$-$C_6$)alkyl) amino substituent(s) may be diluted in a solvent, thereby inhibiting or preventing gelation.

The (A) metal aprotic organosilanoxide compound of formula (I) includes solvates thereof. The solvate may be defined as being a metal aprotic organosilanoxide compound of formula (I) as described except further comprising an aprotic organic solvent molecule. The solvent molecule may contain at least one heteroatom independently selected from N, O, and S. Examples of suitable organic solvents are such as carboxylic esters, ethers, and ketones.

The metal aprotic organosilanoxide compound of formula (I) may be characterized by a concentration of the metal and/or aprotic ($C_2$-$C_{20}$)alkenyl group and/or aprotic ($C_2$-$C_{20}$)alkynyl group therein. Alternatively or additionally, the metal aprotic organosilanoxide compound of formula (I) may be characterized by a molar ratio of the number of moles of the aprotic ($C_2$-$C_{20}$)alkenyl groups and/or aprotic ($C_2$-$C_{20}$)alkynyl groups to the number of moles of the metal. The molar ratio may be abbreviated as "Unsub/Met" wherein Unsub" is the total number of moles of aprotic ($C_2$-$C_{20}$)alkenyl groups and aprotic ($C_2$-$C_{20}$)alkynyl groups and "Met" is the number of moles of metal atoms. In some embodiments, the Unsub/Met is from 1 to 2δ+, alternatively from 1 to δ+, alternatively 1, alternatively 2, alternatively 3.

Aspect 13. A composition comprising the metal aprotic organosilanoxide compound of any one of aspects 1-12 and at least one other constituent. The composition may be characterized by a concentration of the metal aprotic organosilanoxide compound of formula (I) therein. The concentration may be 5 to <100 weight percent (wt %), alternatively 10 to <100 wt %, alternatively 20 to <100 wt %, alternatively 50 to <100 wt %, alternatively 67 to <100 wt %, alternatively 75 to <100 wt %, alternatively 90 to <100 wt %, alternatively 50 to 80 wt %, alternatively 20 to 50 wt %, alternatively 99 to <100 wt % of the composition. The wt % concentration may be determined by tracking amounts of constituents added to the composition. Alternatively or additionally, the total concentration of the aprotic ($C_2$-$C_{20}$)alkenyl groups and aprotic ($C_2$-$C_{20}$)alkynyl groups in constituent (A) is from >0 to 10 millimoles per gram of constituent (A) (mmol/g), alternatively from >0 to 5 mmol/g, alternatively from 0.5 to 5 mmol/g, alternatively from 1.0 to 4.0 mmol/g. Alternatively or additionally, the metal aprotic organosilanoxide compound of formula (I) may be characterized by a concentration of the metal therein. The metal concentration may be 0.01 to 100 millimoles per gram (mmol/g) of the metal aprotic organosilanoxide compound of formula (I), alternatively 0.01 to 50 mmol/g, alternatively 0.020 to 20 mmol/g, alternatively 0.050 to 10 mmol/g, alternatively 0.10 to 5 mmol/g, alternatively 0.15 to 5 mmol/g of the metal aprotic organosilanoxide compound of formula (I). The mmol/g metal concentration may be determined by tracking amounts of constituents added to prepare the metal aprotic organosilanoxide compound of formula (I). Alternatively, the composition may be characterized by a concentration of the metal therein. The metal concentration may be 5 to <100 mole percent (mol %), alternatively 10 to <100 mol %, alternatively 20 to <100 mol %, alternatively 50 to <100 mol %, alternatively 67 to <100 mol %, alternatively 75 to <100 mole %, alternatively 90 to <100 mol %, alternatively 50 to 80 mol %, alternatively 20 to 50 mol %, alternatively 99 to <100 mol % of the composition. The mol % metal concentration may be determined by tracking amounts of constituents added to the composition.

The at least one other constituent of the composition is different than the metal aprotic organosilanoxide compound of formula (I) in structure; phase; function; metal content, if any; silicon content, if any; proticity; or a combination of any two or more thereof. The at least one other constituent may be the same phase as, alternatively a different phase than the metal aprotic organosilanoxide compound of formula (I) (e.g., both may be solids, or one may be a liquid and the other a solid). The at least one other constituent may be free of, alternatively exhibit an adhesion promoting effect. The at least one other constituent may be free of, alternatively contain Si atoms. The at least one other constituent may be free of, alternatively contain metal atoms. The at least one other constituent may be aprotic, alternatively protic. Examples of the at least one other constituent are constituents (a) to (h): (a) an organosilanol compound of formula (II): $R^1$—Si($R^2$)($R^3$)—[O—Si($R^4$)($R^5$)]$_m$—OH (II), wherein subscript m and groups $R^1$-$R^5$ are as defined for formula (I); (b) a metal aprotic organosilanoxide ligand intermediate of formula (III): $R^1$—Si($R^2$)($R^3$)—[O—Si($R^4$)($R^5$)]$_m$-O$M^2$(<L)$_o$($X^1$)$_p$ (III), wherein subscripts m, o and p and groups $R^1$-$R^5$, L, and $X^1$ are independently as defined for formula (I), and metal atom, $M^2$, is an element of Group 1 or a hemi-element of Group 2; (c) an organosilane-diol compound of formula (IV):H—[O—Si($R^4$)($R^5$)]$_m$—OH (IV), wherein subscript m and groups $R^4$-$R^5$ are as defined for formula (I); (d) an organosilanoxide-ol compound of formula (V): H—[O—Si($R^4$)($R^5$)]$_m$-O$M^2$HL)$_o$($X^1$)$_p$ (V), wherein subscripts m, o, and p and groups $R^4$-$R^5$, L, and $X^1$ and metal $M^2$ are as defined for formula (III); (e) a dimetal organosilan-dioxide of formula (VI): $R^6$-O$M^1$[O—Si($R^4$)($R^5$)]$_m$—O-$M_1$O—$R^6$ (VI), wherein each $R^6$ independently is {$R^1$—Si($R^2$)($R^3$)— or $X^1$, and subscript m, metal $M^1$, and groups $R^1$-$R^5$ and $X^1$ are independently as defined for formula (I); (f) a metal organosilan-dioxide of formula (VII): c[—[*O—Si($R^4$)($R^5$)]$_m$—O-$M^{1*}$]O—$R^6$ (VII), wherein "c[* ... *]" indicates a cyclic group bonding the *O to the $M^{1*}$; each $R^6$ independently is {$R^1$—Si($R^2$)($R^3$)— or $X^1$, and subscript m, metal $M^1$, and groups $R^1$-$R^5$ and $X^1$ are independently as defined for formula (I); and (g) a di-endcapped organosilanediol compound of formula (VIII):

R$^1$—Si(R$^2$)(R$^3$)—[O—Si(R$^4$)(R$^5$)]$_m$—O—Si(R$^2$)(R$^3$)—R$^1$ (VIII), wherein subscript m and groups R$^1$-R$^5$ are as defined for formula (I); and (h) combinations thereof. Typically, the composition is free of (i.e., lacks) a compound having a silicon-bonded hydroxyl group (Si—OH). E.g., typically the composition is free of the compounds of formulas (II), (IV), and (V).

In other aspects the invention comprises the dimetal organosilan-dioxide of formula (VI). The embodiments may include the dimetal organosilan-dioxide of formula (VI) instead of, alternatively in addition to, the metal aprotic organosilanoxide compound of formula (I).

In other aspects the invention comprises the metal organosilan-dioxide of formula (VII). The embodiments may include the dimetal organosilan-dioxide of formula (VII) instead of, alternatively in addition to, the metal aprotic organosilanoxide compound of formula (I).

The composition may be formulated to be curable as described later for "curable formulation". As such, the at least one other constituent of the curable composition or formulation may comprise, instead of or in addition to constituents (a) to (g), a monomer, prepolymer, or curable polymer. In some aspects the curable composition or formulation further comprises a crosslinker, a cure catalyst, or both. The curable composition or formulation may be formulated to be condensation curable, hydrosilylation curable, and/or free radical curable as described later.

In some embodiments M$^2$ is an element of Group 1 selected from Li, Na, K, and Cs; alternatively Li, Na, and K; alternatively Li and Na; alternatively Li and K; alternatively Na and K; alternatively Li; alternatively Na; alternatively K. In some embodiments M$^2$ is a hemi-element of Group 2 selected from hemi Mg, hemi Ca, and hemi Ba; i.e., 0.5 Mg, 0.5 Ca, and 0.5 Ba. When m is 3 or 4, the organosilanol compound may be referred to as an oligoorganosilanol compound; and when m is 5 to 100, the organosilanol compound may be referred to as a polyorganosilanol compound.

Aspect 14. A cured product of curing the composition of aspect 13.

Aspect 15. A method of making the metal aprotic organosilanoxide compound of formula (I), the method comprising contacting n mole equivalents of an organosilanol compound of formula (II): {R$^1$—Si(R$^2$)(R$^3$)—[O—Si(R$^4$)(R$^5$)]$_M$—OH (II), wherein subscripts m and n and groups R$^1$ to R$^5$ are as defined for formula (I), with a metal salt reactant of formula (A): M$^1$(X$^1$)$_q$ (A), or a solvate thereof, wherein M$^1$ is a metal atom Al, Ce, Fe, or V having a formal positive oxidation state, δ$^+$, of +1 to +3 for Al, +2 to +4 for Ce, +1 to +6 for Fe, or +1 to +5 for V, wherein the metal atom of M$^1$ of formula (A) is the same as the metal atom of M$^1$ of formula (I) and wherein the formal positive oxidation state, δ$^+$, of M$^1$ in formula (A) is the same as or different than the formal positive oxidation state, δ$^+$, of M$^1$ in formula (I); optionally in the presence of L, an aprotic Lewis base to give the metal aprotic organosilanoxide compound of formula (I) subscript q=the formal positive oxidation state, δ$^+$, of M$^1$ in formula (A) and each X$^1$ independently is a halide or an aprotic organoheteryl anion, wherein each X$^1$ in formula (A) independently is the same as or different than X$^1$ in formula (I).

The organosilanol compound of formula (II) may be obtained from commercial sources or synthesized by selectively endcapping the organosilane-diol compound of formula (IV):H—[O—Si(R$^4$)(R$^5$)]$_m$—OH (IV), wherein subscript m and groups R$^4$-R$^5$ are as defined for formula (IV). The organosilane-diol compound of formula (IV) has on average, per molecule, one SiOH group at each terminus, and may be selectively endcapped by contacting it with one molar equivalent of an endcapper compound of formula R$^1$—Si(R$^2$)(R$^3$)—X$^1$, wherein R$^1$-R$^3$ are as defined for formula (I) and X$^1$ independently is a halide or an aprotic organoheteryl anion. The aprotic organoheteryl anion may be as defined above, e.g., an alkoxide (i.e., RXO$^-$), a carboxylate (i.e., RXC(=O)O$^-$), an oximate (i.e., RX$_2$C=NO$^-$), a secondary amino (RX$_2$N—), or a trihydrocarbylsilanoxide (i.e., RX$_3$SiO$^-$). Each RX independently is an aprotic (C$_1$-C$_{20}$)hydrocarbyl selected from a (C$_1$-C$_{20}$) alkyl, (C$_2$-C$_{20}$)alkenyl, or (C$_6$-C$_{20}$)aryl; alternatively a (C$_1$-C$_6$)alkyl or (C$_2$-C$_6$)alkenyl; alternatively (C$_1$-C$_6$)alkyl; alternatively methyl, ethyl, or phenyl. Endcapping methods are well-known in the art.

The organosilane-diol compound of formula (IV):H—[O—Si(R$^4$)(R$^5$)]$_m$—OH (IV) may be obtained from commercial sources or made by methods that are well-known in the art. For example, by contacting, under condensation reaction conditions, water with a diorganosilane of formula (B): (X$^1$)$_2$SiR$^4$R$^5$ (B), wherein groups R$^4$ and R$^5$ are as defined for formula (IV) and group X$^1$ is independently a halide or an aprotic organoheteryl anion as defined above.

Aspect 16. The method of making of aspect 15 wherein the formal positive oxidation state, δ$^+$, of M$^1$ in formula (A) is different than the formal positive oxidation state, δ$^+$, of M$^1$ in formula (I), and the method further comprises a reduction or oxidation reaction step, as the case may be, to convert the formal positive oxidation state, δ$^+$, of the metal, M$^1$, of the metal salt reactant of formula (A) to the formal positive oxidation state, δ$^+$, of the metal, M$^1$, of the metal organosilanoxide compound of formula (I). The reduction or oxidation reaction step may further include a reductant or oxidant, respectively, to effect the reduction or oxidation. The reductant is used when the δ$^+$ of M$^1$ in formula (A) is greater than the δ$^+$ of M$^1$ in formula (I). The oxidant is used when the δ$^+$ of M$^1$ in formula (A) is less than the δ$^+$ of M$^1$ in formula (I). The reduction or oxidation reaction step may occur before, during, and/or after the contacting step. The reduction or oxidation reaction may occur in the same or different reactor vessel as the contacting step.

Aspect 17. The method of making of aspect 15 wherein the formal positive oxidation state, δ$^+$, of M$^1$ in formula (A) is the same as the formal positive oxidation state, δ$^+$, of M$^1$ in formula (I), and the method may not further comprise a reduction or oxidation step and may not further comprise a reductant or oxidant. In some embodiments each X$^1$ in formula (A) is the same as X$^1$ in formula (I). In some embodiments the δ$^+$ of M$^1$ in formula (A) is the same as the δ$^+$ of M$^1$ in formula (I); the method does not further comprise a reduction or oxidation step and does not further comprise a reductant or oxidant; and each X$^1$ is the same in formulas (A) and (I). In some embodiments each X$^1$ is a halide, alternatively an aprotic organoheteryl anion, alternatively an alkoxide.

The method of making the metal aprotic organosilanoxide compound of formula (I) may comprise contacting an organosilanol precursor compound (e.g., the organosilanol of formula (II) described above) with a metal salt reactant that is free of silicon (e.g., the metal salt reactant of formula (A) described above) to give a product reaction mixture comprising the metal aprotic organosilanoxide compound of formula (I) and a by-product, described below. The metal salt reactant (e.g., the metal salt reactant of formula (A) described above) may be obtained from commercial sources or synthesized by any suitable method, many of which are well-known in the art.

The contacting step prepares the metal aprotic organosilanoxide compound of formula (I) directly from the organosilanol precursor compound and the metal salt reactant without going through an intermediate metal aprotic organosilanoxide ligand complex wherein the metal is not the same metal as $M^1$ in formula (I). When $X^1$ in formula (A) independently is a halide, the contacting step and the product reaction mixture further comprises a metal non-nucleophilic base, such as an organoheteryl metal wherein the metal is the same metal as $M^1$ in formula (I); and the product reaction mixture further comprises a second by-product. The by-products are an organoheteryl-H corresponding to the organoheteryl metal and a metal halide salt corresponding to the halide. When the organoheteryl is an alkoxide and the halide is a chloride, the by-products are an alcohol corresponding to the alkoxide and a metal chloride corresponding to the halide.

Alternatively, when $X^1$ in formula (A) independently is the aprotic organoheteryl anion, the metal non-nucleophilic base, such as an organoheteryl metal wherein the metal is the same metal as $M^1$ in formula (I), may be omitted from the contacting step, and thus from the resulting product reaction mixture. For example, when in formula (A) $X^1$ independently is an alkoxide, the method of making the metal aprotic organosilanoxide compound of formula (I) may comprise contacting the organosilanol precursor compound (e.g., the organosilanol of formula (II) described above) with a metal alkoxide salt reactant that is free of silicon (e.g., the metal salt reactant of formula (A) described above wherein each $X^1$ independently is an alkoxide) to give a product reaction mixture comprising the metal aprotic organosilanoxide compound of formula (I) and an alcohol by-product corresponding to the alkoxide.

The product reaction mixture that contains the metal aprotic organosilanoxide compound of formula (I) and by-product(s) may be used "as is", i.e., without further processing, or may be further processed. Further processing of the product reaction mixture may comprise removing the by-product(s) therefrom, removing any solvent therefrom, isolating and/or purifying the metal aprotic organosilanoxide compound of formula (I) therefrom, and/or solvent-exchanging the solvent of the product reaction mixture for (replacing with) another solvent. The by-product that is the organoheteryl-H, e.g., the alcohol, and the solvent may be removed from the product reaction mixture by any suitable technique such as evaporating, distilling, stripping, blotting, decanting, triturating, extracting, or a combination of any two or more thereof. The by-product that is the metal halide may be removed from the product reaction mixture by any suitable technique such as filtering or centrifuging/decanting. The isolating and/or purifying may comprise precipitating or filtering the metal aprotic organosilanoxide compound of formula (I) therefrom, alternatively precipitating or filtering the by-product therefrom. The precipitating may be performed by cooling the product reaction mixture and/or by adding to the reaction mixture a desolubilizing additive such as an organic liquid in which the would-be precipitate is insoluble. The contacting step and further processing steps may be carried out using conventional techniques for air and moisture sensitive materials such as vacuum-gas manifold equipment (so-called Schlenk line techniques), cannula transfers, inert gas atmospheres, anhydrous solvents, and the like. These techniques are well known.

In an alternative embodiment, the method of making the metal aprotic organosilanoxide compound of formula (I) may comprise going through an intermediate metal aprotic organosilanoxide ligand complex wherein the metal is not Al, Ce, Fe, or V. In such embodiments, the method comprises preliminarily contacting the organosilanol precursor compound (e.g., the organosilanol of formula (II) described above) with an effective amount of a Group 1 metal or Group 2 hemi-metal non-nucleophilic base such as a Group 1 metal or Group 2 hemi-metal alkoxide (e.g., potassium tertiary-butoxide), a Group 1 metal or Group 2 hemi-metal secondary amide (e.g., lithium diisopropylamide), a Group 1 metal or Group 2 hemi-metal carbanion (e.g., tertiary-butyl lithium), a Group 1 metal or Group 2 hemi-metal hydride (e.g., NaH or $CaH_2$), a Grignard reagent (e.g., ethyl magnesium bromide), or a Group 1 metal or Group 2 hemi-metal disilazane (e.g., potassium bis(trimethylsilyl)amide) to give an intermediate reaction mixture comprising a metal aprotic organosilanoxide ligand intermediate and an intermediate by-product. The intermediate by-product is an alcohol corresponding to the alkoxide, a secondary amine corresponding to the secondary amide, a hydrocarbon corresponding to the carbanion, molecular hydrogen, a hydrocarbon (e.g., ethane) corresponding to the Grignard reagent, or a bis(trialkylsilyl)amine corresponding to the disilazane. The Group 1 metal and Group 2 hemi metal may be as defined above for $M^2$ in formula (III). The Group 1 metal may be lithium, sodium, potassium, or cesium. The Group 2 hemi-metal may be hemi-magnesium or hemi-calcium (i.e., 0.5 Mg or 0.5 Ca). After the preliminary contacting step, the contacting step described in the preceding paragraphs is performed except the metal aprotic organosilanoxide ligand intermediate is used in place of the organosilanol precursor compound.

The intermediate reaction mixture that contains the metal aprotic organosilanoxide ligand intermediate and an intermediate by-product may be used "as is", i.e., without further processing, or may be further processed. Further processing of the intermediate reaction mixture may comprise may comprise isolating and/or purifying the metal aprotic organosilanoxide ligand intermediate therefrom, or concentrating or solvent-exchanging the intermediate reaction mixture; all prior to the next contacting step. The isolating and/or purifying may comprise precipitating or filtering the metal aprotic organosilanoxide ligand intermediate therefrom, alternatively precipitating or filtering the by-product therefrom. The precipitating may be performed by cooling the intermediate reaction mixture and/or by adding to the intermediate reaction mixture a desolubilizing additive such as an organic liquid in which the would-be precipitate is insoluble. The preliminary contacting step and further processing steps may be carried out using conventional techniques for air and moisture sensitive materials such as vacuum-gas manifold equipment (so-called Schlenk line techniques), cannula transfers, inert gas atmospheres, anhydrous solvents, and the like.

The contacting steps described herein independently are typically performed in a solvent such as an organic solvent or a polydimethylsiloxane fluid, and so the reaction mixtures typically further comprises the solvent. Examples of suitable aprotic organic solvents are hydrocarbons such as isoalkanes, toluene, and xylenes; ethers such as tetrahydrofuran and dioxane; alcohols such as 2-propanol and 1-butanol; ketones such as methyl ethyl ketone; and pyridine. In some aspects the solvent is aprotic, alternatively protic. The contacting steps may be conducted at any suitable temperatures such as from −50° to 150° C. for any suitable period of time such as from 1 minute to 1 day. Generally, the higher the contacting temperature the shorter the period of time.

The metal aprotic organosilanoxide compound of formula (I) may be used as such or as a constituent in a variety of formulations, which include silicone formulations and organic formulations. Examples of such formulations are adhesives, coatings, elastomers, encapsulants, pottants, and sealants, each of which include silicone formulations and organic formulations. Embodiments of the metal aprotic organosilanoxide compound of formula (I) that are used as such may be used as a primer, filler treating agent, or condensation reaction catalyst. The primer may be used on a substrate that is in need of adhesion, coating, elastomer, encapsulating, potting, or sealing. The filler treating agent may be used on an untreated filler. Examples of untreated fillers that may be treated with the metal aprotic organosilanoxide compound of formula (I) are silica, boron nitride, alumina, and zirconium dioxide; alternatively silica, boron nitride, and alumina; alternatively silica and boron nitride; alternatively silica and alumina; alternatively silica; alternatively boron nitride; alternatively alumina; alternatively zirconium dioxide. Additional examples of untreated fillers that may be treated with the metal aprotic organosilanoxide compound of formula (I) are metal powders, ceramic particles, and mixtures thereof. Additional examples of untreated fillers that may be treated with the metal aprotic organosilanoxide compound of formula (I) are carbon particles such as carbon nanotubes (e.g., single-wall or multi-wall), powdered diamond, powdered graphite, graphene, and carbon blacks. Examples of metal powders are powders of aluminum, cobalt, copper, gold, iron, nickel, palladium, platinum, silver, tin, titanium, zinc, and alloys of any two or more thereof. The metal particles may have a metal oxide or metal nitride surface layer. The metal particles may be core-shell particles comprising a non-metallic core (e.g., glass beads or spheres) and an outer metal shell disposed thereon. Examples of ceramic particles are zinc oxide; alumina; a nitride such as an aluminum nitride or boron nitride; a metal oxide such as aluminum oxide, beryllium oxide, copper oxide, magnesium oxide, nickel oxide, silver oxide, zinc oxide, or a combination of any two or more thereof; a metal hydroxide such as aluminum trihydrate or magnesium hydroxide; onyx, a metal carbide such as silicon carbide or tungsten carbide; or a metal titanate such as barium titanate. The ceramic particles differ from the metal particles, including the metal particles having a metal oxide or metal nitride surface layer or support material in at least one feature, structure, function, reactivity or property. The condensation reaction catalyst may be used for catalyzing curing of monomers, prepolymers, and/or curable polymers. Examples of monomers, prepolymers, or curable polymers whose curing may be catalyzed by the metal aprotic organosilanoxide compound of formula (I) are urethane, SiOH functional silanes, and SiOH-functional organosiloxanes. Curing of the urethane monomers, prepolymers, or curable polymers gives condensation cured polyurethanes. Curing of the SiOH-functional silanes or organosiloxane prepolymers or curable polymers gives condensation cured polyorganosiloxanes. The untreated filler may be in the shape of cuboidals, flakes, granules, irregulars, needles, powders, rods, spheres, or a mixture of any two or more of cuboidals, flakes, granules, irregulars, needles, powders, rods, and spheres.

Embodiments of the metal aprotic organosilanoxide compound of formula (I) that are used as a constituent in the silicone formulation may function as an adhesion promoter or co-promoter, e.g., in the adhesive, coating, elastomer, encapsulant, pottant, or sealant formulation. The formulations are expected to have enhanced adhesion to a substrate compared to an identical formulation except lacking the metal aprotic organosilanoxide compound of formula (I). The adhesive, coating, elastomer, encapsulant, pottant, or sealant formulation may be applied to a substrate in need of adhesion, coating, elastomeric functionality, encapsulating, potting, or sealing. Embodiments of the metal aprotic organosilanoxide compound of formula (I) that are used as an adhesion promoter may function to enhance adhesion of the adhesive, coating, elastomer, encapsulant, pottant, or sealant formulation to a substrate.

In embodiments of the metal aprotic organosilanoxide compound of formula (I) that are used as an adhesion co-promoter, the formulation may further comprise an additional constituent that is an adhesion promoter other than the metal aprotic organosilanoxide compound of formula (I), such as a conventional adhesion promoter. When functioning as an adhesion co-promoter, the metal aprotic organosilanoxide compound of formula (I) may enhance the adhesion-promoting effect of the conventional adhesion promoter so as to synergistically increase adhesion of the adhesive, coating, elastomer, encapsulant, pottant, or sealant formulation to a substrate. In any embodiment the substrate may be unprimed (bare) or primed prior to applying the adhesive, coating, encapsulant, or sealant formulation thereto. A primed substrate is a substrate that has been pre-treated with a primer, which may be the same as or different than the metal aprotic organosilanoxide compound of formula (I), wherein pre-treatment occurs prior to the applying step.

In some aspects the composition that comprises the metal aprotic organosilanoxide compound of formula (I) and at least one other constituent is used as the adhesive formulation, coating formulation, elastomer formulation, encapsulant formulation, pottant formulation, or sealant formulation. In some aspects the formulation is an organic formulation (e.g., an epoxy-based adhesive formulation). In other aspects the formulation is a silicone formulation such as a silicone adhesive formulation, a silicone coating formulation, a silicone elastomer formulation, a silicone encapsulant formulation, a silicone pottant formulation, or a silicone sealant formulation. The organic or silicone adhesive formulation may be a pressure-sensitive adhesive formulation.

Substrate materials that are suitable for being adhered, coated, encapsulated, potted, or sealed with the formulations include silicate glass, metals, organic polymers, polyorganosiloxanes, wood, paper, and semiconductor materials such as silicon and silicon carbide. The substrate in need of adhesion, coating, encapsulating, potting, or sealing may be a container, fabric, plastic film, paper, printed circuit board, structural member of a machine, vehicle, or manufactured article, or textile.

The formulations are useful in a variety of industries such as building, construction, consumer products, electronics, energy, infrastructure, packaging, telecommunications, and transportation. For example, the adhesive formulation may be used as a tie layer in a photovoltaic cell module to adhere a photovoltaic cell to a substrate or superstrate thereof. The coating formulation may be used to coat an air bag in vehicular applications such as automotive applications. The elastomer formulation may be used as a vibration dampening component of an electronic device. The encapsulant formulation may be used to encapsulate a solid state light such as a light-emitting diode (LED), a photovoltaic device such as a photovoltaic or solar panel or battery, or an electronic device such as a printed circuit. The pottant formulation may be used to pot a power converter component such as a microinverter. The sealant formulation may be used to seal a display panel to a frame of a smartphone or flat-screen television.

As mentioned earlier, the composition may be formulated to be a curable formulation such as a curable silicone formulation. The curable silicone formulation may be formulated to be condensation curable, hydrosilylation curable, free radical curable, or dual-curable. In some aspects the silicone formulations are condensation curable and/or free radical curable, alternatively hydrosilylation curable and/or free radical curable; alternatively condensation curable and/or hydrosilylation curable, alternatively condensation curable, alternatively hydrosilylation curable, alternatively free radical curable, alternatively dual curable. The dual-curable formulations may be curable by condensation and free radical curing mechanisms or hydrosilylation and free radical curing mechanisms. The free radical curing may comprise radiation curing, peroxide curing, or both. The rate of curing may be enhanced by applying heat, pressure, or both to the formulation.

The at least one other constituent of the curable silicone formulation may comprise, instead of or in addition to constituents (a) to (g), a monomer, prepolymer or curable polymer. Upon curing, the monomer, prepolymer or curable polymer are chemically converted into a polymer of higher molar mass, and then into a network. In some aspects the curable silicone formulation further comprises a crosslinker, a cure catalyst, or both. The crosslinker may be used to form the network. These foregoing constituents are chosen based on the intended curing mechanism being used. For example, for hydrosilylation curing the monomer, prepolymer or curable polymer may contain silicon-bonded unsaturated aliphatic groups and the crosslinker may contain silicon-bonded hydrogen atoms (SiH groups). For example, for free radical curing the monomer, prepolymer or curable polymer and the crosslinker independently may contain silicon-bonded unsaturated aliphatic groups. For condensation curing, the monomer, prepolymer or curable polymer and the crosslinker independently may contain silicon-bonded hydrolyzable groups. For dual curing, the monomer, prepolymer or curable polymer may contain two different types of curable groups.

The free radical curing uses radiation and/or a peroxide to initiate curing. The radiation may comprise ultraviolet radiation. The peroxide may be an inorganic or organic peroxide. The inorganic peroxide may be a hydroperoxide. The organic peroxide may be a peroxycarboxylic ester or a peroxycarboxylic anhydride.

Condensation curing uses water as a curing agent and, optionally, a condensation reaction catalyst. Typical condensation reaction catalysts are tin (Sn) compounds. Hydrosilylation curing uses a hydrosilylation catalyst and/or a crosslinker. The hydrosilylation catalyst typically is based on platinum, rhodium, ruthenium, or palladium. Typically, the hydrosilylation catalyst is a Pt catalyst. In other aspects the composition may further comprise a titanium and/or zirconium aprotic organosilanoxide compound.

Therefore, in some embodiments the present invention further comprises a mixture of the metal aprotic organosilanoxide compound of formula (I) and a metal aprotic organosilanoxide compound of formula (VIII): $(R^1—Si(R^2)(R^3)—\{O—Si(R^4)(R^5)\}_m—O\}_n-M^3(\leftarrow L)_o(X^1)_p$ (VIII), wherein $M^3$ is Pt having a formal positive oxidation state, $\delta^+$, of +1 to +6, Pd having a formal positive oxidation state, $\delta^+$, of +1 to +6, Rh having a formal positive oxidation state, $\delta^+$, of +1 to +6, Ru having a formal positive oxidation state, $\delta^+$, of +1 to +8, Sn having a formal positive oxidation state, $\delta^+$, of +1 to +4, Ti having a formal positive oxidation state, $\delta^+$, of +1 to +4, or Zr having a formal positive oxidation state, $\delta^+$, of +1 to +4; and wherein subscripts m, n, o, and p; and groups L, $X^1$, and $R^1$ to $R^5$ are independently as defined above for formula (I). In some aspects of formula (VIII), $\delta^+$ for Pt is +2 or +4, $\delta^+$ for Pd is +2 or +4, $\delta^+$ for Ru is +3 or +4, $\delta^+$ for Rh is +3, $\delta^+$ for Sn is +2 or +4, $\delta^+$ for Ti is +4, and $\delta^+$ for Zr is +4. In some aspects of the mixture, in the metal aprotic organosilanoxide compound of formula (VIII), $M^3$ is Pt, Pd, Rh, or Ru; alternatively Pt or Rh; alternatively Pt, alternatively Pd, alternatively Rh, alternatively Ru; and $M^3$ is not Sn, Ti, or Zr. In other aspects of the mixture, in the metal aprotic organosilanoxide compound of formula (VIII), $M^3$ is Sn, Ti, or Zr; alternatively Sn or Ti; alternatively Sn or Zr; alternatively Ti or Zr; alternatively Sn, alternatively Ti, alternatively Zr; and $M^3$ is not Pt, Pd, Rh, or Ru. The crosslinker may be an organosiloxane having on average, per molecule, two or more silicon-bonded hydrogen atoms (Si—H groups). The metal aprotic organosilanoxide compound of formula (I) may be as described in any one of aspects 1 to 11.

The formulations may be formulated as 1-part formulations or as multi-part formulations such as a 2-part formulations. The constituents of the formulations may be mixed together by any suitable means such as by mechanically agitating them together such as by shaking or stirring. The formulations may be packaged as such along with instructions for their use in a particular application such as adhesive, coating, elastomerizing, encapsulating, potting, or sealing application. The multi-part formulations may be packed in multiple packages and the instructions may further include directions for combining the different parts prior to use in a particular application. The metal aprotic organosilanoxide compound of formula (I) may be may be kept in a separate part and other constituents in other part(s), and then the parts may be mixed with each other just prior to use in the application. The multi-part formulation may be stored at any suitable temperature such as from 20° to 40° C.

When the metal aprotic organosilanoxide compound of formula (I) is used in a 1-part formulation, the 1-part formulation may be stored at a lower temperature such as from −20° to 20° C. In some embodiments the metal aprotic organosilanoxide compound of formula (I) may be made in situ in the 1-part or multiple-part formulation. For example, the organosilanol compound of formula (II): $\{R^1—Si(R^2)(R^3)—[O—Si(R^4)(R^5)]_m—OH$ (II) may kept in one part, the monomer, prepolymer or curable polymer and other constituents such as crosslinker in another part, the catalyst in still another part, and the metal salt reactant of formula (A): $M^1(X^1)_q$ (A) may be kept in a fourth part, and then shortly before use of the formulation, the first and fourth parts may be combined with heating to form the metal aprotic organosiloxane compound of formula (I) in situ, the by-product such as alcohol may be removed, and then the resulting product may be combined with the other parts to give the formulation.

Embodiments of the present invention also include a cured product prepared by curing the curable formulation. In some aspects the cured product is a cured organic product prepared by curing the curable organic formulation (e.g., a curable epoxy formulation). In other aspects the cured product is a cured silicone product prepared by curing any one of the curable silicone formulations. The curing may be performed by heating the curable silicone formulations at cure temperatures of from 70° to 200° C., alternatively 80° to 150° C., alternatively 90° to 120° C. Advantageously, the curing may produce the cured silicone product, wherein the cured silicone product is free of bubbles.

Advantageously, the inventive cured silicone product prepared by curing the curable silicone formulation may have improved tolerance for moisture content residing on surface of substrate in order for the cured silicone product to achieve good adhesion to the substrate. This means that there may be no need to pre-dry the surface of the substrate before applying the inventive curable silicone formulation thereto, especially when the moisture content of the surface of the substrate is from >0 to ≤1.8 wt %. In contrast, a cured product of an identical comparative (non-invention) curable silicone formulation except lacking the metal aprotic organosilanoxide compound of formula (I) may have significantly lower adhesion to the surface of the substrate having the same moisture content.

Advantageously, the adhesion of the inventive cured silicone product prepared by curing the curable silicone formulation may be further improved when the curable silicone formulation is an addition curable formulation such as hydrosilylation curable or free radical curable. In order to achieve adhesion to a substrate by the hydrosilylation cured silicone products prepared by hydrosilylation curing the hydrosilylation curable silicone formulations, heating at relatively low adhesion-producing temperatures of from 70° to 120° C., alternatively 80° to 110° C., alternatively 90° to 100° C. may be sufficient. In contrast, an identical comparative (non-invention) hydrosilylation curable silicone formulation except lacking the metal aprotic organosilanoxide compound of formula (I) may require higher adhesion-producing temperatures ≥140° C. The improvement in adhesion is enhanced further, and stability to heat may be beneficially increased, when the inventive hydrosilylation curable silicone formulation contains a platinum hydrosilylation catalyst, whereas the non-invention hydrosilylation curable silicone formulation contains a titanium catalyst such as tetrabutyl titanate and may exhibit poor heat stability.

The metal aprotic organosilanoxide compound of formula (I) may be a liquid, which enables increased compatibility with other silicones materials such as silicone prepolymers or curable silicone polymers such as those prepolymers and curable polymers based on dimethylsilicones or methyl, phenyl silicones. This compatibility can beneficially enable the curable silicone formulations, and cured silicone products prepared by curing same, to be optically clear. flexible designs of formulations and applications.

In some embodiments the metal aprotic organosilanoxide compound of formula (I) may be any one of, or a combination of any two of, the Examples 1A, 1AA, 1B to 1G, 2A to 2E, 3A to 3E, and 4A described later.

This description has been written intentionally so that any one stated feature or limitation of an example, any one stated Markush subgenus or species, or any one stated number of a range or subrange, may be relied upon and provides adequate support for amending the claims. A catchall phrase such as "and a solvate thereof" and "or a combination of any two or more thereof" that follows a listing of features or limitations applies independently to each one of the features or limitations, and also stands as a separate feature or limitation.

Unless otherwise defined herein, named general terms have the following meanings. Alternatively precedes a distinct embodiment. Articles "a", "an", and "the" each refer to one or more. Any comparative example is used for illustration purposes only and shall not be prior art. Free of or lacks means a complete absence of; alternatively not detectable, e.g., using nuclear magnetic resonance (NMR) spectroscopy (e.g., $^{1}$H-NMR, $^{13}$C-NMR, or $^{29}$Si-NMR) or Fourier Transform-Infrared (FT-IR) spectroscopy. Invention and inventive shall mean a representative embodiment or aspect, not the entire invention. IUPAC is International Union of Pure and Applied Chemistry (IUPAC Secretariat, Research Triangle Park, N.C., USA). A Markush group of members A and B may be equivalently expressed as: "a member selected from A and B"; "a member selected from the group consisting of A and B"; or "a member A or B". Each member may independently be a subgenus or species of the genus. May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Removing a component from a mixture of components does not include selectively derivatizing/reacting the component to form a derivative/product unless the derivative/product is then physically separated from the other components of the mixture.

Unless otherwise defined herein, named chemical technology terms have the meanings defined by IUPAC or, for non-IUPAC terms, by Hawley's CONDENSED CHEMICAL DICTIONARY, 11th edition, N. Irving Sax & Richard J. Lewis, Sr., 1987 (Van Nostrand Reinhold). Some IUPAC terms are found in IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook. Aprotic means free of —OH, —NH, —SH, and —PH groups. Average molecular mass of a polymer such as weight average molecular mass ("$M_W$") is determined using gel permeation chromatography (GPC) with polystyrene standards. Chemical element and Group of chemical elements shall mean those published by IUPAC in the Periodic Table of the Elements, version dated 1 May 2013. Compound shall mean a molecule or collection of such molecules; composition shall mean a mixture of two or more different compounds, wherein the mixture may be configured to be non-curable, alternatively configured to be curable; formulation shall mean a composition configured for a particular use to have a particular material property such as an acoustical, chemical, electrical, magnetic, mechanical, optical, physical, radiological, or thermal property, or a combination of any two or more thereof. Cured product such as cured organosiloxane may have a structure that can be varied depending upon the particular reactants and curing conditions used to make it. This variability is not unlimited, but is restricted according to the structures of the reactants (e.g., backbone and/or curable group structures) and curing chemistry and conditions. Formulation, one-part, means a mixture containing all the constituents and in proportions needed to produce a cured product. The one-part formulation may use external factors such as moisture (for condensation curing), heat (for addition curing), or light (for addition curing) to initiate, speed or complete the curing process. Formulation, two-part, means a system that segregates different reactive constituents into two separate and complementary divisions to prevent premature initiation of curing. For example, a monomer, prepolymer, or curable polymer, but not a catalyst, may be included in a primary part; and a cure catalyst, but not a monomer, prepolymer, or curable polymer, may be included in a secondary part. Initiation of curing is achieved by combining the primary part and the secondary part together to form a one-part formulation. Substituted means having, in place of hydrogen, one or more substituents, including per substitution. Each substituent may independently be a halogen atom, —$NH_2$, —NHR, —$NR_2$, —$NO_2$, —OH, —OR, oxo (=O), —C≡N, —C(=O)—R, —OC(=O)R, —C(=O)OH, —C(=O)OR, —SH, —SR, —SSH, —SSR, —SC(=O)R, —$SO_2R$, —$OSO_2R$, —$SiR_3$, or —$Si(OR)_3$; wherein each R independently is an unsubstituted ($C_1$-$C_{30}$)hydrocarbyl, alternatively ($C_1$-$C_6$)hydrocarbyl. Halogen atom is F, Cl, Br, or I; alternatively F, Cl, or Br; alternatively F or Cl; alternatively F; alternatively Cl. Each substituent, alternatively all substituents may be aprotic, alternatively protic. Vehicle means a liquid acting as a carrier, diluent, dispersant, storage medium, supernatant, or solvent for another material.

Any compound herein includes all its isotopic forms, including natural abundance forms and/or isotopically-enriched forms. The isotopically-enriched forms may have additional uses, such as medical or anti-counterfeiting applications, wherein detection of the isotopically-enriched form is helpful in treatment or investigation.

In some aspects any composition or formulation described herein may contain any one or more of the chemical elements of Groups 1 to 18 of the Periodic Table of the Elements. In other aspects at least one such chemical element is specifically excluded from the composition or formulation, except where such exclusion would negate the same. E.g., Si atoms are not excluded from silicon compounds and carbon atoms are not excluded from organo groups. In some aspects elements that are not excluded are Si, O, H, C, N, F, Cl, Br, and I; alternatively Si, O, H, C, F, and Cl.

The invention is further illustrated by, and an invention embodiment may include any combinations of features and limitations of, the non-limiting examples thereof that follow. Ambient temperature is about 23° C. unless indicated otherwise.

EXAMPLES $^{29}$Si-NMR instrument and solvent: a Varian 400 MHz Mercury spectrometer was used. $C_6D_6$ was used as the solvent. The term OH content used in the Examples means the weight (or moles) of HO— groups as a percentage of total weight (or moles) of product, wherein only HO— groups that are bonded to silicon atoms are included.

Preparations 1, 2, 3, 4, 5, 6, and 7: synthesis of examples of organosilanol compounds of formula (II).

Preparation 1: mixed 101.6 grams (g) di(OH-terminated)-PDMS fluid (Gelest DMS-S12; "PDMS" means polydimethylsiloxane) with 33.2 g 1,2-divinyl-1,1,2,2-tetramethyldisilazane in a 250 mL three-neck flask. Added 0.1 g trifluoroacetic acid (TFA) to catalyze the reaction. Stirred the mixture for 80 minutes at room temperature, and then removed volatiles using a rotatory evaporator at 1-3 mm Hg vacuum for 2 hours at approximately 30° C. Produced desired product, which was the remainder (not the volatiles), as a clear liquid (114.2 g). Based on $^{29}$Si NMR, the product had —OH content of 3.2 wt % and Vi content of 5.5 wt % and included over 50 wt % of the following silicone fluid of formula: Vi(Me)$_2$Si[OSi(Me)$_2$]$_n$OH, wherein n is 5 or 6, Vi is vinyl, and Me is methyl.

Preparation 2: mixed 404.3 g di(OH-terminated)-poly (dimethyl)(vinyl,methyl)silicone fluid (Dow Corning® 4-7042 fluid) with 80.0 g 1,1,1,2,2,2-hexamethyldisilazane (HMDZ) in a 1 liter three-neck flask. Added 0.2 g TFA to catalyze the reaction. Used an ice bath to remove heat and keep temperature below 30° C. After 3 hours removed volatiles using a rotatory evaporator at 1-3 mm Hg vacuum for 2 hours at approximately 30° C. Produced desired product, which was the remainder (not the volatiles), as a clear liquid (447.9 g) that was determined by $^{29}$Si NMR to have a —OH content of 4.7 wt % and calculated, assuming mass balance conservation, to have a Vi content of 10.2 wt %. The product includes over 50% of the silicone fluid of formula: (Me)$_3$Si[OSi(Me)(Vi)]$_n$OH, wherein n is about 4, Vi is vinyl, and Me is methyl.

Preparation 3 (prophetic): mix 405.2 g di(OH-terminated)-PDMS fluid with 79.9 g 1,2-dimethyl-1,1,2,2-tetravinyldisilazane in a 1 liter three-neck flask. Add 0.28 g TFA to catalyze the reaction. Use a water bath to remove heat and keep temperature below 30° C. After 2.5 hours remove volatiles using a rotatory evaporator at 1-3 mm Hg vacuum for 5.5 hours at 25° to 30° C. Produce desired product, which is the remainder (not the volatiles), as a clear liquid (427.5 g) that is determined by $^{29}$Si NMR to have —OH content of 3.25 wt % and a Vi content of 2 wt %. The product includes over 50% of the silicone fluid of formula: Vi(Me)$_2$Si[OSi(Me)$_2$]$_n$OH, wherein n is 5 or 6, Vi is vinyl, and Me is methyl.

Preparation 4: mixed 103.7 g di(OH-terminated)-poly (phenyl,methyl)siloxane (Dow Corning® PB fluid) with 15.38 g 1,2-divinyl-1,1,2,2-tetramethyldisilazane in a 250 mL three-neck flask. Added 3 drops of TFA to catalyze the reaction. Stirred the mixture at room temperature for 2 hours, and then removed volatiles using a rotatory evaporator at 1-3 mm Hg vacuum for 1 hour at 65° C. Produced desired product, which was the remainder (not the volatiles), as a clear liquid (111.0 g) that was determined by $^{29}$Si NMR to have a —OH content of 2.84 wt % and a Vi content of 2.98 wt %. The product includes over 50% of the silicone fluid of formula: Vi(Me)$_2$Si[OSi(Me)(Ph)]$_n$OH, wherein n is 4 or 5, Ph is phenyl, Vi is vinyl, and Me is methyl.

Preparations 5-7: alternative method to remove by-product ammonia ($NH_3$) after reaction of di(OH-terminated)-polydiorganosiloxane with a disilazane:

Preparation 5: mixed 134.6 g di(OH-terminated)-poly (phenyl,methyl)siloxane (Dow Corning® PB fluid) with 134.6 g toluene and 16.3 g HMDZ in a 500 mL three-neck flask. Added 0.1 g TFA to catalyze the reaction. Stirred the mixture at room temperature for 30 minutes, and then transferred it to a separatory funnel. Added 260 g heptane to the separatory funnel, and washed the resulting solution with 250 g of water four times until the water washings had a pH value from pH 6 to pH 7; in the third water wash step, added 0.2 g acetic acid to adjust pH. Removed residual water remaining in the heptane solution by drying the solution over anhydrous sodium sulfate, removed volatiles using a rotatory evaporator at 1-3 mm Hg vacuum for 2 hour at 50°-60° C. Produced desired product, which was the remainder (not the volatiles), as a clear liquid (138.1 g) that was determined by $^{29}$Si NMR to have a —OH content of 3.32 wt % and a Vi content of 0 wt %. The product included over 50 wt % of the silicone fluid of formula: (Me)$_3$Si[OSi(Me)(Ph)]$_n$OH, wherein n is 4 or 5, Ph is phenyl, and Me is methyl.

Preparation 6: mixed 432 g di(OH-terminated)-poly(phenyl,methyl)siloxane (Dow Corning® PB fluid) with 320 g heptanes and 64.6 g 1,2-divinyl-1,1,2,2-tetramethyldisilazane in a 1 liter three-neck flask. Added 2.0 g TFA to catalyze the reaction. Stirred the mixture at room temperature for 1.5 hours, and then transferred it to a separatory funnel. Washed the solution two times with 500 g of brine (aqueous NaCl), one time with 500 g water acidified with 1.0 g acetic acid, and then one time with 500 g neutral pH water. Removed residual water from the heptanes solution by drying the solution over anhydrous sodium sulfate. Renived volatiles using a rotatory evaporator at 1-3 mm Hg vacuum for 2 hour at 55° C. Produced desired product, which was the remainder (not the volatiles), as a clear liquid (425.1 g) that was determined by $^{29}$Si NMR to have a —OH content of 4.09 wt % and a Vi content of 1.55 wt %. The product included over 50 wt % of the silicone fluid of formula: Vi(Me)$_2$Si[OSi(Me)(Ph)]$_n$OH, wherein n is 4 or 5, Ph is phenyl, Vi is vinyl, and Me is methyl.

Preparation 7: mixed 703.8 g di(OH-terminated)-PDMS fluid (Gelest DMS-S12) with 53.6 g 1,2-divinyl-1,1,2,2-tetramethyldisilazane in a 2 liter three-neck flask. Added 1.35 g TFA to catalyze the reaction. Stirred the mixture at room temperature for 2 hours, and then transferred it to a separatory funnel. Added 160 g heptanes to the mixture, and washed the heptanes solution consecutively with a) 420 g brine containing 6.0 g acetic acid; b) 420 g brine containing 1.0 g acetic acid; c) 420 g water containing 1.0 g acetic acid; and d) 420 g pH neutral water. Removed residual water from the heptanes solution by drying the solution over anhydrous sodium sulfate. Removed volatiles using a rotatory evaporator at 1-3 mm Hg vacuum for 2 hour at 30° C. Produced desired product, which was the remainder (not the volatiles), as a clear liquid (706.1 g) that was determined by $^{29}$Si NMR to have a —OH content of 5.78 wt % and a Vi content of 3.22 wt %. The product included over 50% of the silicone fluid of formula: Vi(Me)$_2$Si[OSi(Me)$_2$]$_n$OH, wherein n is 5 or 6, Vi is vinyl, and Me is methyl.

Examples 1A, 1 AA, 1B, 1C, 1D, 1E, 2A, 2B, 2C, 2D, 2E, 3A, 3B, 3C, 3D, 3E, 4A, and 5A: Syntheses of Examples of the Metal Aprotic Organosilanoxide Compound of Formula (I)

Example 1A: mixed 2.70 g aluminum secondary-butoxide solution (70% in secondary-butanol) with 8.0 g toluene and 15.70 g of the product silicone fluid of Preparation 1. Stirred the mixture at room temperature for 30 minutes, and then removed volatiles using a rotatory evaporator at 1-3 mm Hg vacuum for 2 hours at approximately 50° C. Produced desired product, which was the remainder (not the volatiles), as a clear liquid (14.2 g) that was calculated, assuming mass balance conservation, to have an Al content of 0.54 millimoles Al per gram of product (mmol/g; 1.46 wt %) and Vi content of 2.0 mmol/g (5.4 wt %).

Example 1AA: mixed 3.68 g aluminum secondary-butoxide solution (70% in secondary-butanol) with 13.0 g toluene and 17.1 g of the product silicone fluid of Preparation 1. Stirred the mixture at room temperature for 30 minutes, and then removed volatiles using a rotatory evaporator at 1-3 mm Hg vacuum for 2 hours at approximately 50° C. Produced desired product, which was the remainder (not the volatiles), as a clear liquid (15.6 g) that was calculated, assuming mass balance conservation, to have an Al content of 0.67 mmol/g (1.81 wt %) and Vi content of 2.0 mmol/g (5.4 wt %).

Example 1B: mixed 1.90 g titanium tetraisopropoxide (TPT) with 8.0 g toluene and 16.35 g of the silicone fluid of Preparation 1. Stirred the mixture at room temperature for 30 minutes, and then removed volatiles using a rotatory evaporator at 1-3 mm Hg vacuum for 2 hours at approximately 50° C. Produced desired product, which was the remainder (not the volatiles), as a clear liquid (15.15 g) that was calculated, assuming mass balance conservation, to have Ti content of 0.44 mmol/g (2.1 wt %) and a Vi content of 2.0 mmol/g (5.4 wt %).

Example 1C: mixed 35 g zirconium n-propoxide (NPZ) solution (70% in n-propanol) with 8.0 g toluene and 15.60 g of the silicone fluid of Preparation 1. Stirred the mixture at room temperature for 30 minutes, and then removed volatiles using a rotatory evaporator at 1-3 mm Hg vacuum for 2 hours at approximately 50° C. Produced desired product, which was the remainder (not the volatiles), as a clear liquid (14.4 g) that was calculated, assuming mass balance conservation, to have a Zr content of 0.35 mmol/g (3.2 wt %) and a Vi content of 2.0 mmol/g (5.4 wt %).

Example 1D (prophetic): mix 5 g of the product of Example 1A with 5 g of the product of Example 1B to give 10 g of desired product (remainder) as a clear liquid that is calculated, assuming mass balance conservation, to have an Al content of 0.27 mmol/g (0.73 wt %), a Ti content of 0.22 mmol/g (1.05 wt %), and a Vi content of 2.0 mmol/g (5.4 wt %).

Example 1E: (prophetic): mix 5 g of the product of Example 1A with 5 g of the product of Example 10 to give 10 g of desired product (remainder) as a clear liquid and is calculated, assuming mass balance conservation, to have an Al content of 0.27 mmol/g (0.73 wt %), a Zr content of 0.17 mmol/g (1.6 wt %), and a Vi content of 2.0 mmol/g (5.4 wt %).

Example 1F (prophetic): repeat the procedure of Example 1A except use 2.70 g iron secondary-butoxide solution (70% in secondary-butanol) instead of the 2.70 g aluminum secondary-butoxide solution. Produce desired product, which is the remainder (not the volatiles), as a clear liquid (14.2 g) that is calculated, assuming mass balance conservation, to have a Fe content of 0.54 mmol/g (3.1 wt %) and a Vi content of 2.0 mmol/g (5.4 wt %).

Example 1G (prophetic): repeat the procedure of Example 1A except use 2.70 g vanadium secondary-butoxide solution (70% in secondary-butanol) instead of the 2.70 g aluminum secondary-butoxide solution. Produce desired product, which is the remainder (not the volatiles), as a clear liquid (14.2 g) that is calculated, assuming mass balance conservation, to have a V content of 0.54 mmol/g (2.75 wt %) and a Vi content of 2.0 mmol/g (5.4 wt %).

Example 2A: mixed 28.2 g aluminum sec-butoxide solution (70% in sec-butanol) with 30.0 g toluene and 109.5 g of the silicone fluid of Preparation 2. Stirred the mixture at room temperature for 30 minutes, and then removed volatiles using a rotatory evaporator at 1-3 mm Hg vacuum for 2 hours at 60°–70° C. Produced desired product, which was the remainder (not the volatiles), as a clear liquid (101.6 g) that was calculated, assuming mass balance conservation, to have an Al content of 0.78 mmol/g (2.1 wt %) and a Vi content of 3.6 mmol/g (9.7 wt %).

Example 2B: mixed 12.8 g titanium tetraisopropoxide (TPT) with 10.0 g toluene and 102.5 g of the silicone fluid of Preparation 2. Stirred the mixture at room temperature for 30 minutes, and then removed volatiles using a rotatory evaporator at 1-3 mm Hg vacuum for 2 hours at 60°–70° C. Produced desired product, which was the remainder (not the volatiles), as a clear liquid (88.3 g) that was calculated, assuming mass balance conservation, to have a Ti content of 0.50 mmol/g (2.4 wt %) and a Vi content of 3.6 mmol/g (9.7 wt %).

Example 2C: mixed 24.5 g zirconium n-propoxide (NPZ) solution (70% in n-propanol) with 30 g toluene and 119.6 g of the silicone fluid of Preparation 2. Stirred the mixture at room temperature for 30 minutes, and then removed volatiles using a rotatory evaporator at 1-3 mm Hg for 2 hours at 60°–70° C. Produced desired product, which was the remainder (not the volatiles), as a clear liquid (102.7 g) that was calculated, assuming mass balance conservation, to have a Zr content of 0.50 mmol/g (4.5 wt %) and a Vi content of 3.5 mmol/g (9.5 wt %).

Example 2D (prophetic): mix 9 g of the product of Example 2A with 1 g of the product of Example 2B to give 10 g of desired product (remainder) as a clear liquid that is calculated, assuming mass balance conservation, to have an Al content of 0.70 mmol/g (1.9 wt %), a Ti content of 0.05 mmol/g (0.24 wt %), and a Vi content of 3.6 mmol/g (9.7 wt %).

Example 2E: (prophetic): mix 9 g of the product of Example 2A with 5 g of the product of Example 2C to give 10 g of desired product (remainder) as a clear liquid that is calculated, assuming mass balance conservation, to have an Al content of 0.70 mmol/g (1.9 wt %), a Zr content of 0.05 mmol/g (0.45 wt %), and a Vi content of 3.5 mmol/g (9.6 wt %).

Example 3A (prophetic): mix 29.0 g aluminum sec-butoxide solution (75% in sec-butanol) with 10 g toluene and 149.9 g of the silicone fluid of Preparation 3. Stir the mixture at room temperature for 30 minutes, and then remove volatiles using a rotatory evaporator at 1-3 mm Hg vacuum for 2 hours at 60°–70° C. Produce desired product, which is the remainder (not the volatiles), as a clear liquid (132.8 g) that is calculated, assuming mass balance conservation, to have an Al content of 0.66 mmol/g (1.8 wt %) and a Vi content of 0.7 mmol/g (2 wt %).

Example 3B (prophetic): mix 16.0 g titanium tetraisopropoxide (TPT) with 119.1 g of the partially capped OH-terminated silicone fluid (Preparation 3). Stir the mixture at room temperature for 30 minutes, and then remove volatiles using a rotatory evaporator at 1-3 mm Hg for 2 hours at 60-70° C. Produce desired product, which is the remainder (not the volatiles), as a clear liquid (107.8 g) that is calculated, assuming mass balance conservation, to have a Ti content of 0.51 mmol/g (2.4 wt %) and a Vi content of 0.7 mmol/g (2 wt %).

Example 3C (prophetic): mix 28.6 g zirconium n-propoxide (NPZ) solution (70% in n-propanol) with 5 g toluene and 130.0 g of the silicone fluid of Preparation 3. Stir the mixture at room temperature for 30 minutes, and then remove volatiles using a rotatory evaporator at 1-3 mm Hg vacuum for 2 hours at 60°–70° C. Produce desired product, which is the remainder (not the volatiles), as a clear liquid (120.7 g) that is calculated, assuming mass balance conservation, to have a Zr content of 0.50 mmol/g (4.5 wt %) and a Vi content of 0.7 mmol/g (2 wt %).

Example 3D: (prophetic): mix 8 g of the product of Example 3A with 2 g of the product of Example 3C to give 10 g of desired product (remainder) as a clear liquid that is calculated, assuming mass balance conservation, to have an Al content of 0.53 mmol/g (1.4 wt %), a Ti content of 0.140 mmol/g (0.5 wt %), and a Vi content of 0.7 mmol/g (2 wt %).

Example 3E: (prophetic): mix 8 g of the product of Example 3A with 2 g of the product of Example 3B to give 10 g of desired product (remainder) as a clear liquid that is calculated, assuming mass balance conservation, to have an Al content of 0.53 mmol/g (1.4 wt %), a Zr content of 0.10 mmol/g (0.9 wt %), and a Vi content of 0.7 mmol/g (2 wt %).

Example 4A: mixed 1.82 g aluminum sec-butoxide solution (75% in sec-butanol) with 20.3 g of the silicone fluid of Preparation 4. Stirred the mixture at room temperature for 30 minutes, and then removed volatiles using a rotatory evaporator at 1-3 mm Hg vacuum for 2.5 hours at 75° C. Produced desired product (remainder) as a clear liquid (19.6 g) that was calculated, assuming mass balance conservation, to have an Al content of 0.28 mmol/g (0.75 wt %) and a Vi content of 1.1 mmol/g (2.9 wt %).

The below claims are incorporated by reference here, and the terms "claim" and "claims" are replaced by the term "aspect" or "aspects," respectively. Embodiments of the invention also include these resulting numbered aspects.

The invention claimed is:

1. A metal aprotic organosilanoxide compound of formula (I): $\{R^1—Si(R^2)(R^3)—[O—Si(R^4)(R^5)]_m—O\}_n-M^1(\leftarrow L)_o(X^1)_p$ (I), wherein $M^1$ is a metal atom Al or Fe having a formal positive oxidation state, $\delta^+$, of +1 to +3 for Al and +1 to +6 for Fe; subscript n is an integer from 1 to $\delta^+$; subscript o is an integer of 0, 1 or 2; each L independently is an aprotic Lewis base; subscript $p=(\delta^+-n)$; each $X^1$ independently is a halide or an aprotic organoheteryl anion; subscript m is an integer from 3 to 100; each of $R^1$ to $R^5$ is independently is an aprotic $(C_1-C_{20})$hydrocarbyl group or aprotic $(C_2-C_{20})$heterohydrocarbyl group, wherein at least one of $R^1$ to $R^5$ independently is an aprotic $(C_2-C_{20})$alkenyl group or aprotic $(C_2-C_{20})$alkynyl group.

2. The metal aprotic organosilanoxide compound of claim 1 wherein $M^1$ is Al and $\delta^+$ is +3 or $M^1$ is Fe and $\delta^+$ is +2 or +3.

3. The metal aprotic organosilanoxide compound of claim 1 wherein subscript n is an integer from 2 to $\delta^+$.

4. The metal aprotic organosilanoxide compound of claim 1 wherein subscript o is 1 or 2.

5. The metal aprotic organosilanoxide compound of claim 1 wherein subscript m is an integer from 3 to 50.

6. The metal aprotic organosilanoxide compound of claim 1 wherein each of $R^1$ to $R^5$ is independently as defined in any one of limitations (i) to (x):
   (i) each of $R^1$ to $R^5$ is independently an aprotic $(C_1-C_{20})$ hydrocarbyl group or aprotic $(C_2-C_{20})$heterohydrocarbyl group, wherein at least one of $R^1$ to $R^5$ independently is an aprotic $(C_2-C_{20})$alkenyl group;
   (ii) each of $R^1$ to $R^5$ is independently an aprotic $(C_1-C_{20})$ hydrocarbyl group, wherein at least one of $R^1$ to $R^5$ independently is an aprotic $(C_2-C_{20})$alkenyl group or aprotic $(C_2-C_{20})$alkynyl group;
   (iii) each of $R^1$ to $R^5$ is independently an aprotic $(C_1-C_{20})$ hydrocarbyl group, wherein at least one of $R^1$ to $R^5$ independently is an aprotic $(C_2-C_{20})$alkenyl group;
   (iv) each of $R^1$ to $R^5$ is independently an aprotic $(C_1-C_{20})$ hydrocarbyl group, wherein at least one of $R^1$ to $R^5$ independently is an aprotic $(C_2-C_{20})$alkynyl group;
   (v) at least one of $R^1$ to $R^5$ independently is an aprotic $(C_2-C_{20})$alkenyl group or aprotic $(C_2-C_{20})$alkynyl group, at least one of $R^1$ to $R^5$ independently is an aprotic $(C_2-C_{20})$heterohydrocarbyl group, and any remaining $R^1$ to $R^5$ independently is an aprotic $(C_1-C_{20})$hydrocarbyl group;
   (vi) at least one of $R^1$ to $R^5$ independently is an aprotic $(C_2-C_{20})$alkenyl group, at least one of $R^1$ to $R^5$ independently is an aprotic $(C_2-C_{20})$heterohydrocarbyl group, and any remaining $R^1$ to $R^5$ independently is an aprotic $(C_1-C_{20})$hydrocarbyl group;
   (vii) limitation (v) or (vi) wherein at least two of $R^1$ to $R^5$ independently are aprotic $(C_2-C_{20})$heterohydrocarbyl groups;
   (viii) any one of limitations (i) to (vii) wherein at least two of $R^1$ to $R^5$ independently are aprotic $(C_2-C_{20})$alkenyl and/or aprotic $(C_2-C_{20})$alkynyl groups;

(ix) any one of limitations (i) to (viii) wherein at least two of $R^1$ to $R^5$ independently are aprotic $(C_2-C_{20})$alkenyl groups; and (x) any one of limitations (i) to (ix) wherein each aprotic $(C_1-C_{20})$hydrocarbyl group is independently selected from an aprotic $(C_1-C_{20})$alkyl, aprotic $(C_3-C_{20})$cycloalkyl, and aprotic $(C_6-C_{20})$aryl group.

7. A composition comprising the metal aprotic organosilanoxide compound of claim 1 and at least one other constituent.

8. The composition of claim 7 wherein the at least one other constituent is a metal aprotic organosilanoxide compound of formula (VIII): $\{R^1—Si(R^2)(R^3)—[O—Si(R^4)(R^5)]_m—O\}_n\text{-}M^3(\leftarrow L)_o(X^1)_p$ (VIII), wherein $M^3$ is Pt having a formal positive oxidation state, $\delta^+$, of +1 to +6, Pd having a formal positive oxidation state, $\delta^+$, of +1 to +6, Rh having a formal positive oxidation state, $\delta^+$, of +1 to +6, Ru having a formal positive oxidation state, $\delta^+$, of +1 to +8, Sn having a formal positive oxidation state, $\delta^+$, of +1 to +4, Ti having a formal positive oxidation state, $\delta^+$, of +1 to +4, or Zr having a formal positive oxidation state, $\delta^+$, of +1 to +4; and wherein subscripts m, n, o, and p; and groups L, $X^1$, and $R^1$ to $R^5$ are independently as defined above for formula (I).

9. The composition of claim 7 in a cured state.

10. A method of making the metal aprotic organosilanoxide compound of formula (I): $\{R^1—Si(R^2)(R^3)—[O—Si(R^4)(R^5)]_m—O\}_n\text{-}M^1(\leftarrow L)_o(X^1)_p$ (I), the method comprising contacting n mole equivalents of an organosilanol compound of formula (II): $\{R^1\text{-}Si(R^2)(R^3)—[O\text{-}Si(R^4)(R^5)]_m—OH$ (II), wherein subscripts m and n and groups $R^1$ to $R^5$ are as defined for formula (I), with a metal salt reactant of formula (A):

$M^1(X^1)_q$ (A), or a solvate thereof, wherein $M^1$ is a metal atom Al or Fe V having a formal positive oxidation state, $\delta^+$, of +1 to +3 for Al or +1 to +6 for Fe, wherein the metal atom of $M^1$ of formula (A) is the same as the metal atom of $M^1$ of formula (I) and wherein the formal positive oxidation state, $\delta^+$, of $M^1$ in formula (A) is the same as or different than the formal positive oxidation state, $\delta^+$, of $M^1$ in formula (I); optionally in the presence of L, an aprotic Lewis base to give the metal aprotic organosilanoxide compound of formula (I) subscript q=the formal positive oxidation state, $\delta^+$, of $M^1$ in formula (A) and each $X^1$ independently is a halide or an aprotic organoheteryl anion, wherein each $X^1$ in formula (A) independently is the same as or different than $X^1$ in formula (I).

11. The method of claim 10 wherein the formal positive oxidation state, $\delta^+$, of $M^1$ in formula (A) is the same as the formal positive oxidation state, $\delta^+$, of $M^1$ in formula (I).

\* \* \* \* \*